United States Patent Office  3,598,865
Patented Aug. 10, 1971

3,598,865
POLYGLYCOSIDES AND PROCESS OF PREPARING MONO AND POLYGLYCOSIDES
Baak W. Lew, Wilmington, Del., assignor to Atlas Chemical Industries, Inc., Wilmington, Del.
No Drawing. Filed Feb. 7, 1968, Ser. No. 703,539
Int. Cl. C07c 47/18
U.S. Cl. 260—210R          14 Claims

ABSTRACT OF THE DISCLOSURE

Glycosides are prepared by reacting a monosaccharide, or a compound hydrolyzable to a monosaccharide, with a monohydric alcohol having from 8 to 25 carbon atoms, in the presence of an acid catalyst selected from the group consisting of sulfuric acid, hydrochloric acid, phosphoric acid, phosphorous acid, toluene-sulfonic acid, and boron trifluoride, and in the presence of a latent solvent selected from the group consisting of primary and secondary alcohols having from 3 to 5 carbon atoms. The glycosides of the present invention are advantageously used for a variety of purposes, such as gelling agents, lubricants, wetting agents, dyeing assistants, textile softeners and food emulsifiers.

---

The present invention relates to glycosides and processes for the preparation thereof. More specifically, this invention relates to glycosides in which the alcohol moiety has high molecular weight and the glycoside is surface active.

It is known to produce alkyl mono glucosides by the Fischer process which involves heating glucose and a lower alcohol together with an acid catalyst. This process is simple and economical. However, the process is inoperative when the alcohol moiety has more than about three or four carbon atoms due to the insolubility of the sugar in such higher alcohols.

It is known to prepare mono glycosides by the process of transglycosidation of methyl glycoside. This process, however, is subject to the same limitations as the Fischer method, that is, it is inoperative when applied to the higher alcohols.

Hexyl, octyl, nonyl, decyl, and dodecyl mono beta-glucosides were made by Noller and Rockwell (J.A.C.S. 60 2076, 1938) using the well-known Koenings-Knorr method. This multiple-step method is cumbersome and expensive and is of no commercial importance.

U.S. Patent No. 3,219,656 shows the preparation of higher alkyl mono glucosides using a macroreticular-structured sulfonic acid resin in the anhydrous form as catalyst. Only such catalysts are disclosed and the patent states that glucose and higher molecular weight alcohols are non-reactive when using sulfuric acid, hydrochloric acid, mercuric acetate, and conventional or gel type cation exchange resins as catalyst.

The above-described prior art methods for the production of alkyl glycosides produce only monoglycosides. Monoglycosides of alcohols having twelve or more carbon atoms are virtually insoluble in water, thus limiting their usefulness in many applications where water solubility is required.

It has now been discovered that it is possible to prepare high alkyl glycosides by reacting a monosaccharide, or a compound hydrolyzable to a monosaccharide, with a high molecular weight alcohol without using a macroreticular-structured sulfonic acid resin in the anhydrous form as catalyst. It has also been discovered that it is possible to prepare glycosides containing more than one sugar unit per alcohol.

In accordance with the present invention, glycosides are prepared by reacting a monosaccharide, or a compound hydrolyzable to a monosaccharide, with a monohydric alcohol having from 8 to 25 carbon atoms, in the presence of an acid catalyst selected from the group consisting of sulfuric acid, hydrochloric acid, phosphoric acid, phosphorous acid, toluene-sulfonic acid, and boron trifluoride, and in the presence of a latent solvent selected from the group consisting of primary and secondary alcohols having from 3 to 5 carbon atoms.

The term "latent solvent" denotes a medium which is actually not a solvent for the system in question, which is sugar and higher alkyl alcohol, but which by its presence in the above-described process becomes a good solvent by virtue of its ability to affect reactivity in the above system in such a manner that solvency is produced. In the absence of such a latent solvent, the reaction will not occur or will occur to such a minor extent that solvency does not occur. Primary and secondary alcohols having from 3 to 5 carbon atoms are in fact poor solvents for monosaccharides.

The amount of latent solvent used may vary widely. However, no advantage is gained by using more than about ten grams of latent solvent per gram of monosaccharide and partial insolubility may result by using much less than about two grams of latent solvent per gram of monosaccharide. Thus, the amount of latent solvent used may vary from about 2 to about 10 grams, preferably from about 4 to about 6 grams, per gram of monosaccharide.

Typical examples of the primary and secondary alcohols having from 3 to 5 carbon atoms which may be used as the reactive solvent are butanol-1, propanol-1, pentanol-1, propanol-2, butanol-2, pentanol-2, and pentanol-3. Butanol-1 is the preferred latent solvent.

The preferred acid catalyst is sulfuric acid due to its low cost and ease of its removal after the reaction is completed, although other acid catalysts, such as hydrochloric acid, phosphoric acid, phosphorous acid, boron trifluoride, and toluene-sulfonic acid may also be used. The amount of acid catalyst used may be between about 0.001% and about 0.3% preferably between about 0.002% and about 0.2%, based on the weight of the total charge. While less catalyst may be used, the time for the reaction will be longer. While more catalyst may be used, it would be wasteful since the time of reaction is satisfactory at lower catalyst concentrations.

The monohydric alcohols having from 8 to 25 carbon atoms used in the present invention may be primary or secondary alcohols, straight or branch chained, saturated or unsaturated, alkyl or aralkyl alcohols, ether alcohols, cyclic alcohols, or heterocyclic alcohols. In general, these alcohols are insoluble in water and have essentially no solvent power for the sugar molecule. Typical of the higher molecular weight alcohols which can be employed in the present invention are octyl alcohol, nonyl alcohol, decyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, pentacosyl alcohol, oleyl alcohol, phenoxyethanol, phenoxypolyethoxyethanol containing 5 ethoxy groups, 1 $\underline{H}$, 1 $\underline{H}$, 11 $\underline{H}$-eicosafluoro-1-undecanol, 2-methyl, 7-ethyl, 4-undecanol, and the like. A preferred group of alcohols are those having the formula ROH where R is an alkyl group having from 8 to 25 carbon atoms. A particularly preferred group of alcohols are those where R is an alkyl group having from 10 to 18 carbon atoms.

The monosaccharides of the present invention are the hexoses and pentoses. Typical examples include glucose, mannose, galactose, talose, allose, altrose, idose, arabinose, xylose, lyxose, ribose, and the like. The preferred monosaccharide is glucose due to its availability and low cost. Compounds hydrolyzable to monosaccharides may also be employed, such as maltose, sucrose, lactose, raffinose, methyl glucosides, anhydro sugars such as levoglucosan, and the like.

The molar ratio of high molecular weight alcohol to monosaccharide is suitably between about 0.01 to about 15, and preferably between about 0.05 to about 12. Although higher and lower ratios may be used, no advantage is gained thereby. A higher ratio results in more unreacted alcohol to be removed and a lower ratio results in polysaccharide glycosides which have reduced surface active properties because of over-glycosidation of the higher alcohol. The particular molar ratio to be used depends mainly on the amount of glycosidation desired on the alcohol. A low molar ratio is used to prepare glycosides containing more than one monosaccharide unit per alcohol moiety, that is polysaccharide glycosides. A high molar ratio is used when essentially monoglycosidation is desired. Thus, it is possible to adjust and select the hydrophile-lipophile balance and the water-solubility of the glycoside by controlling the extent of polyglycosidation.

The reaction is suitably carried out at a temperature from 75° C. to 160° C., and preferably from 90° C. to 150° C. Although higher and lower temperatures may be used, no advantage is gained thereby. Lower temperatures result in longer reaction times and higher temperatures may result in some degradation in certain instances.

The polysaccharide glycosides of the present invention are glycosides of reducing polysaccharide containing from 5 to 6 carbon atoms in each monomeric unit of the polysaccharide and a monohydric alcohol containing from 8 to 25 carbon atoms. These glycosides may be represented by the formula AOR in which A is a monovalent radical resulting from the removal of a hydroxyl group from a reducing polysaccharide and is selected from the group consisting of $(C_{6n}H_{10n+1}O_{5n})$ and $(C_{5n}H_{8n+1}O_{4n})$ wherein $n$ is from 2 to 50 and R is a monovalent radical resulting from the removal of a hydroxyl group from a monohydric alcohol having from 8 to 25 carbon atoms.

The glycosides of the present invention are advantageously employed for a variety of purposes, such as detergents, gelling agents, lubricants, wetting agents, dyeing assistants, textile softeners, and food emulsifiers.

The following examples are illustrative of the present invention. It will be appreciated, of course, that that proportion of reactants, time of reaction, and temperature of reaction are somewhat variable; and selection of different sugars, alcohols, and catalysts can readily be effected in the light of the guiding principles and teachings which are disclosed herein. The examples, therefore, are not in any way to be construed as limitative of the scope of the present invention.

EXAMPLE 1

Preparation of oxo-octyl 2.3 glucoside

A mixture of 100 g. of glucose, 500 ml. of n-butyl alcohol, 0.06 ml. of concentrated sulfuric acid, and 217 g. of oxo-octyl alcohol (3 mols per mole of glucose) was refluxed at 117–121° C. for one and one-half hours. Butyl alcohol was then distilled from the reaction mixture until a temperature of 130° C. was reached (12 minutes). Distillation of the n-butyl alcohol was then carried out under a partial pressure of 225 mm. Hg for another 50 minutes, at which time all of the n-butyl alcohol and the water of reaction had been distilled off. The catalyst was then neutralized by the addition of 0.13 g. of sodium carbonate dissolved in 3 ml. of water. The unreacted oxo-octyl alcohol was removed by distillation at 0.35 mm. to a temperature of 100° C., to yield 121 g. (0.1% free reducing sugar) of an amber glassy material. This yield indicated that the product contained on the average 2.3 glucose units per oxo-octyl alcohol unit. This value is calculated from the weight of glucose recited and the yield of glucoside, employing 180 and 130 as the molecular weights of glucose and oxo-octyl alcohol, respectively, and recognizing that one mol of water splits out for each mol of glucose reacted.

Weight of glucose radical in product=$100 \times 162/180$=90
Weight of alcohol in product=$121-90$=31
Glucose units per alcohol unit=$90/162 \times 130/31$=2.3

EXAMPLE 2

Preparation of n-decyl-2.2 glucoside

A mixture of 20 g. of methyl glucoside, 100 ml. of butanol-1, 32.7 g. of decanol-1 (2 mols per mole of glucose), and 0.01 ml. of concentrated sulfuric acid was refluxed at 120–122° C. for two hours in a 250 ml. three-necked flask provided with a stirrer, thermometer, and reflux condenser. Butanol-1 was then distilled from the reaction mixture until a temperature of 130° C. was reached (10 minutes), at which time the pressure was slowly reduced to 100 mm. mercury over a period of two hours while the temperature was held at 125–130° C. At this time all of the butanol-1 used and the calculated amount of methanol had been distilled off. The catalyst was neutralized by the addition of 0.021 g. of sodium carbonate dissolved in 10 ml. of water. The unreacted decanol-1 was then removed by a vacuum distillation at 0.1 mm. mercury pressure to a temperature of 105° C. to yield 24.3 g. of an amber glassy resin. This yield indicated an average reaction of 2.2 mols of glucose on each decanol-1 molecule. Analysis indicated a free reducing sugar content of 0. The product showed good foaming power and good detergent activity.

EXAMPLE 3

Preparation of n-decyl 1.4 galacto-glucoside

A mixture of 100 g. of lactose monohydrate, 650 ml. of butanol-1, and 0.46 ml. of concentrated sulfuric acid was refluxed at 114–115° C. for 20 hours. 524 g. of n-decyl alcohol (12 mols per mol of lactose) was added. The reaction mixture was heated to distill butanol-1 at 119° C., partial pressure was applied so that in 30 minutes the pressure was 50 mm. while the temperature was allowed to drop to 95° C. After two hours of reaction under reduced pressure, the pressure was lowered to 25 mm. for 30 minutes, at which time all of the butanol-1 and the water of reaction had been removed. The catalyst was neutralized by the addition of 0.932 g. of sodium carbonate in 10 ml. of water. The water and the unreacted n-decyl alcohol was distilled off to a temperature of 145° C. at 0.2 mm. mercury pressure. The product was an amber, slightly sticky solid with excellent foaming power and analyzed 0.0% free reducing sugar. The yield was 153.2 grams which indicated that the lactose molecule had been split and that an average of 1.4 hexose units had been condensed on each n-decyl alcohol unit.

EXAMPLE 4

Preparation of n-dodecyl 2.5 glucoside

A mixture of 20 g. of levoglucosan, 41.4 g. of dodecanol-1 (1.8 mols per mol of levoglucosan), 150 ml. butanol-1, and 0.006 ml. concentrated sulfuric acid was refluxed (120–123° C.) for one hour in a 500 ml. 3-necked flask provided with a stirrer, a thermometer and a reflux condenser. The clear solution was distilled at atmospheric pressure till a temperature of 130° C. was reached (15 minutes), at which time the pressure was gradually lowered to 50 mm. mercury in 35 minutes while the temperature was held at approximately 130° C. At the end of 1.5 hours of reaction under reduced pressure all of the butanol-1 had been recovered in the distillate. The catalyst was neutralized with 0.17 g. of sodium carbonate dissolved in 10 ml. of water. The unreacted dodecanol-1 was then removed by distillation at 0.1 mm. to a temperature of 150° C. The product weighed 29.2 g., an amber, hard, waxy material. This yield indicated that the product contained on the average 2.5 glucose units per dodecanol unit.

EXAMPLE 5

Preparation of oxo-tridecyl 25 glucoside

A mixture of 720 g. of D-glucose, 3200 ml. of n-butyl alcohol, 40.1 g. of oxo-tridecyl alcohol (0.05 mol per mol of glucose), and 0.3 ml. of concentrated sulfuric acid was refluxed for 2 hours at 112–115° C. Distillation of n-butyl alcohol from the reaction mixture was then carried out until a temperature of 120° C. was reached (30 minutes). Partial pressure was then applied to the distillation so that a pressure which varied from 50–100 mm. mercury was held, as allowed by the foaming reaction mixture without any foaming over, while the temperature was held at approximately 90° C. After 90 minutes of reaction under reduced pressure, the reaction mixture was a porous hard solid. After another 30 minutes of reaction, the porous solid was broken up and the reaction continued as a fluidized bed by stirring at 100–150° C. and a pressure of 20 mm. mercury. After 6.5 hours of reaction under reduced pressure, the reaction was 83% complete, as shown by the fact that 83% of the n-butyl alcohol had been removed. 103 g. out of 738 grams of the reaction product was removed for analyses and tests. The product was a grayish powder, soluble in water. Analysis: reducing sugar, 0.3%; free oxo-tridecyl alcohol, 1.5%. It possessed good foaming powder. The low free reducing sugar value and the presence of 1.5% of free unreacted oxo-tridecyl alcohol indicated that the product at this 83% reaction point had an average of 23 glucose residues on each oxo-tridecyl alcohol. To the remainder of the reaction product was added 2 l. of acetone and 0.59 g. of sodium carbonate in 20 ml. of water in order to extract the unreacted oxo-tridecyl alcohol. The stirred mixture was mixed vigorously and the insoluble product filtered off and washed with acetone again to yield 622 g. of a water soluble light tan powder. Analysis: reducing sugar, 0.5%; free oxo-tridecyl alcohol, 0.9%. The yield, corrected for the sample removed, was 723 grams which indicated an average of 27 glucose units condensed on each unit of oxo-tridecyl alcohol, to give an average by the two methods of 25.

EXAMPLE 6

Preparation of n-tetradecyl 13 glucoside

A mixture of 720 g. of D-glucose, 3200 ml. of n-butyl alcohol, 172 g. of n-tetradecyl alcohol (0.2 mol per mol of glucose), and 0.3 ml. of concentrated sulfuric acid was refluxed at 114–118° C. for 2 hours. Butyl alcohol was then distilled from the reaction mixture until a temperature of 121° C. was reached (30 minutes). Partial pressure was then applied to the distillation so that in 45 minutes a pressure of 25 mm. mercury was reached, while the temperature was allowed to drop to 100° C. After 35 minutes under partial pressure the reaction mixture became a porous solid cake and the stirrer was turned off. After 90 minutes the cake was broken up and the reaction was resumed by stirring to a fluidized bed with the temperature at 110–115° C. and the pressure at 20 mm. mercury. After a total of 3½ hours under partial pressure, all of the n-butyl alcohol had been distilled off. One liter of acetone and 0.59 g. of sodium carbonate in 10 ml. of water was added to the reaction mixture, to extract unreacted n-tetradecyl alcohol, and after vigorous mixing, the insoluble product was filtered off. The product was a light tan powder, soluble in water, and showed the following analysis: total sugar, 89.5%; reducing sugar, 0.6%; free n-tetradecyl alcohol, 0.8%. The yield was 715 grams which indicated that an average of 13 glucose units had condensed on each n-tetradecyl unit.

EXAMPLE 7

Preparation of n-hexadecyl 19 glucoside

A mixture of 720 g. of D-glucose, 3200 ml. of n-butyl alcohol, 193.9 g. of n-hexadecyl alcohol (0.2 mol per mol of glucose), and 0.3 ml. of concentrated sulfuric acid was refluxed for 2 hours at 114–117° C. Butyl alcohol was then distilled from the reaction mixture until a temperature of 125° C. was reached (40 minutes). Partial pressure was then applied to the distillation so that in 45 minutes the pressure was at 20 mm. Hg while the temperature was allowed to drop to 110° C. After 25 minutes under partial pressure, the reaction mixture became a porous solid cake and the stirrer was turned off. After 1¼ hours of reaction under reduced pressure, the porous cake was broken up and the reaction resumed by stirring to a fluidized bed and at a temperature of 115–120° C. and a pressure of 15 mm. of mercury. After a total of 3⅓ hours of reaction under reduced pressure, all of the n-butyl alcohol had been distilled off. One liter of acetone and 0.595 g. of sodium carbonate in 10 ml. of water was added to extract unreacted n-hexadecyl alcohol. The insoluble product was filtered off, washed with acetone again and filtered. The product was a light tan powder, soluble in water. Analysis: reducing sugar, 0.7%; free n-hexadecyl alcohol, 0.7%. The yield was 698 grams which indicated that the product had an average of 19 glucose residues condensed on each alcohol residue.

EXAMPLE 8

Preparation of n-octadecyl 19 glucoside

A mixture of 720 g. of D-glucose, 3200 mol of n-butyl alcohol, 162.3 g. of n-octadecyl alcohol (0.15 mol per mol of glucose), and 0.3 ml. of concentrated sulfuric acid was refluxed at 115–119° C. for 2 hours. n-butyl alcohol was then distilled off till a temperature of 123° C. was reached. Partial pressure was applied to the distillation so that in twenty minutes the pressure was at 40 mm. mercury while the temperature was allowed to drop to 100° C. After one hour of reaction under reduced pressure, the reaction mixture turned to a honey-combed cake. After a further reaction of 45 minutes, the honey-combed cake was broken up and reaction continued by stirring to a fluidized bed with the temperature at 100–105° C. and the pressure at 5 mm. mercury. After a total reaction of 3¾ hours under reduced pressure, all the n-butyl alcohol had been distilled off. Powdered sodium carbonate (0.595 g.) was added to the reaction product, followed by 1 l. of recovered n-butyl alcohol and 1 l. of acetone to remove unreacted n-octadecyl alcohol. The insoluble product was filtered off and washed with acetone. The product was a water-soluble light tan powder. Analysis: reducing sugar, 0.3%; free n-octadecyl alcohol, 0.2%. The yield was 705 grams, which indicated that an average of 19 glucose units had condensed on each n-octadecyl alcohol unit.

EXAMPLE 9

Preparation of oleyl 1.5 glucoside

A mixture of 20 g. of levoglucosan, 100 ml. of butanol-1 and 0.02 ml. of concentrated sulfuric acid was refluxed for 40 minutes in a 500 ml. 3-necked flask provided with a stirrer, a thermometer and a reflux condenser. An amount of 198 g. of oleyl alcohol (6 mols per mol glucose) was added to the reaction mixture and the butanol-1 was distilled off to a temperature of 140° C. The pressure was then decreased gradually so that the pressure was at 30 mm. mercury in a period of 30 minutes while the temperature was kept at 135–140° C. The reaction was continued at this pressure and temperature for another 45 minutes at which time all of the butanol-1 had been distilled off. The catalyst was neutralized by the addition of 0.06 g. of sodium carbonate, dissolved in 10 ml. of water. The unreacted oleyl alcohol was distilled off at 0.2 mm. to a temperature of 216° C. The product was an amber colored semi-solid greasy material. The yield was 42 grams which indicated that 1.5 glucose units had been condensed on each oleyl alcohol molecule.

EXAMPLE 10

Preparation of 1 H̲, 1 H̲, 11 H̲-eicosafluoro-1-undecanol 7 glucoside

A mixture of 20 g. of D-glucose, 100 ml. of butanol-1 and 0.3 ml. of concentrated sulfuric acid was refluxed at 111–113° C. for one hour in a 3-necked flask provided with a stirrer, a thermometer, and a reflux condenser. To the clear colorless solution was added 148 g. (2.5 mols per mol glucose) of 1 H̲, 1 H̲, 11 H̲-eicosafluoro-1-undecanol and the reaction was continued by distillation of the butanol-1 until a temperature of 140° C. was reached (20 minutes). The pressure was then reduced to 300 mm. mercury over a period of 15 minutes while the temperature was allowed to drop to 117° C. The distillation was continued at 117–120° C. and 300 mm. mercury pressure for a further 45 minutes, whereupon the temperature was raised to 130–135° C. and the pressure reduced to 200 mm. for a further 25 minutes, at which time all of the butanol-1 and the water of reaction had been removed. The catalyst was neutralized by the addition of 0.06 g. of sodium carbonate dissolved in 10 ml. of water. The unreacted fluoro-undecanol-1 was removed by distillation at 0.4 mm. mercury pressure to a temperature of 115° C. The yield was 26.4 g. of a brownish powder. This yield indicated that an average of seven glucose molecules had reacted on each alcohol molecule.

EXAMPLE 11

Preparation of phenoxyethanol 1.1 glucoside

A mixture of 160 g. of D-glucose, 800 ml. of butanol-1 and 0.17 ml. of concentrated sulfuric acid was refluxed for one hour (112–114° C.) in a 2 liter 3-necked flask provided with a stirrer, a thermometer, and a reflux condenser. There was then added to the resulting clear solution 737 g. of phenoxyethanol (6 mols per mol glucose) and the reaction was continued by distillation of the butanol-1. In 10 minutes, the temperature had risen to 130° C., and a partial vacuum was slowly applied so that in 30 minutes the pressure was at 100 mm. mercury pressure while the temperature was kept at 120–125° C. After a further 30 minutes, the pressure was decreased to 50 mm. of mercury in another 30 minutes. At the end of this time, all of the butanol-1 and the water of reaction had been distilled off. The catalyst was neutralized by the addition of 0.34 g. of sodium carbonate dissolved in 10 ml. of water. The unreacted phenoxyethanol was then removed by distillation at 0.2 mm. mercury pressure to a temperature of 120° C. The yield was 251 g. of a dark slightly sticky brittle resin. The yield indicated that an average of 1.1 mols of glucose had reacted on each mol of phenoxyethanol. The product was moderately soluble in water, was soluble in methyl alcohol and was a light foamer. Analysis: reducing sugar, 0.3%.

EXAMPLE 12

Preparation of n-decyl-2.2 glucoside

Example 2 is repeated except that 0.03 ml. of boron trifluoride etherate is used instead of 0.01 ml. concentrated sulfuric acid to yield glassy resinous n-decyl 2.2 glucoside.

EXAMPLE 13

Preparation of n-dodecyl-2.5 glucoside

Example 4 is repeated except that 0.02 gram of p-toluenesulfonic acid monohydrate is used instead of 0.006 ml. of concentrated sulfuric acid to give amber, hard, waxy n-dodecyl 2.5 glucoside.

EXAMPLE 14

Preparation of oxo-tridecyl-1.6 glucoside

A mixture of 60 g. glucose, 300 ml. propanol-1, and 0.15 ml. concentrated sulfuric acid was refluxed for 2 hours in a 2 liter 3-necked flask provided with a stirrer, thermometer, and reflux condenser. The mixture was then cooled to 85° C., 400.8 g. oxo-tridecyl alcohol (6 mols per mol of glucose) was added to the flask, the mixture heated to reflux, the reaction continued by distillation of propanol-1. In 25 minutes the temperature had risen from 104° C. to 130° C. and a partial vacuum was applied so that the temperature was held at 115–120° C. for 35 minutes while the pressure decreased from 400 mm. to 35 mm. mercury pressure. At the end of this time all the propanol-1 and water of reaction had distilled off. The catalyst was neutralized by addition of 0.298 g. sodium carbonate dissolved in 10 ml. of water. The unreacted oxo-tridecyl alcohol was then removed by distillation at 0.4 mm. mercury pressure to a temperature of 125° C. The product was 95 g. of an amber soft waxy solid. The yield indicated than an average of 1.6 mols of glucose had condensed with each mol of oxo-tridecyl alcohol. The product was slightly soluble in water and soluble in Perclene. Analysis: reducing sugar 0.17%.

EXAMPLE 15

Preparation of oxo-tridecyl-1.6 glucoside

Example 14 is repeated except that butanol-2 is used instead of propanol-1. The product is oxo-tridecyl-1.6 glucoside.

EXAMPLE 16

Preparation of oxo-octyl 1.0 glucoside

Example 1 is repeated except that 12 mols of oxo-octyl alcohol is used per mol of glucose. The product is oxo-octyl 1.0 glucoside.

EXAMPLE 17

The product of Example 7 was formulated as a heavy-duty liquid laundry detergent by mixing 15% glucoside of Example 7 with 35% tetra-potassium pyrophosphate, 1% carboxymethyl cellulose, and 49% distilled water to give a clear liquid. The detergency of this clear liquid detergent was compared with that of a standard liquid detergent, Wisk (Lever Bros.), by washing 4 swatches of standardized soiled cotton cloth (American Conditioning House #115, Roll 363/165/70) for each detergent by the standard Baker Terg-O-Tometer method in water of 300 p.p.m. hardness at 120° F. for 15 minutes at 0.2% liquid detergent concentration, rinsing twice for 3 minutes, drying 1 hour at 185° F., then conditioning 24 hours at 75° F. and 40% relative humidity before measuring the reflectance.

Percent increase in optical reflectance $$= \frac{\text{Washed swatch R} - \text{original R}}{\text{original R}} \times 100$$

where R=optical reflectance of swatch

| Product: | Units of soil removed [1] |
|---|---|
| Wisk | 20.0 |
| n-Hexadecyl 19-glucoside | 26.8 |

[1] Charge in Hunter reflectance units × 100.

What is claimed as new and desired to be protected by Letters Patent of the United States is:

1. A process for the preparation of glycosides which comprises reacting a compound selected from the group consisting of monosaccharides and compounds hydrolyzable to monosaccharides, with a mono-hydric alcohol containing from 8 to 25 carbon atoms, in the presence of an acid catalyst selected from the group consisting of sulfuric acid, hydrochloric acid, phosphoric acid, phosphorous acid, toluene-sulfonic acid, and boron trifluoride, and in the presence of a latent solvent, said latent solvent being a primary or secondary alcohol containing from 3 to 5 carbon atoms and being selected from the group consisting of butanols, propanols, and pentanols.

2. A process as set forth in claim 1 in which the said compound is glucose.

3. A process as set forth in claim 1 in which the said compound is methyl glucoside.

4. A process as set forth in claim 1 in which the said compound is levoglucosan.

5. A process as set forth in claim 1 in which from about 0.01 to about 15 mols of the said mono-hydric alcohol is used per mol of the said compound.

6. A process as set forth in claim 5 in which from about 2 to about 10 grams of the said latent solvent are used per gram of the said compound.

7. A process as set forth in claim 6 in which the reaction temperature is from about 75° C. to about 160° C.

8. A process as set forth in claim 7 in which the amount of acid catalyst is from about 0.001% to about 0.3% by weight based on total charge.

9. A process as set forth in claim 8 in which the said compound is glucose.

10. A glycoside of a reducing polysaccharide containing from 5 to 6 carbon atoms in each monomeric unit of the polysaccharide and containing from 2 to 50 monomeric units and a monohydric aliphatic or araliphatic alcohol containing from 8 to 25 carbon atoms.

11. A glycoside of claim 10 wherein the monohydric alcohol is a saturated or unsaturated alkyl alcohol.

12. A glycoside of claim 11 wherein the monohydric alcohol contains from 10 to 18 carbon atoms.

13. A glycoside of claim 12 wherein the polysaccharide is polyglucose.

14. A glycoside of claim 13 wherein the polyglucose contains up to 25 glucose units.

References Cited

UNITED STATES PATENTS

| | | | |
|---|---|---|---|
| 3,219,656 | 11/1965 | Boettner | 260—210 |
| 3,277,076 | 10/1966 | Yotsuzuka | 260—210 |
| 3,346,558 | 10/1967 | Roth | 260—210 |
| 3,450,690 | 6/1969 | Gibbons et al. | 260—210 |

FOREIGN PATENTS

| | | | |
|---|---|---|---|
| 584,062 | 1/1947 | Great Britain | 260—210 |

LEWIS GOTTS, Primary Examiner

J. R. BROWN, Assistant Examiner

U.S. Cl. X.R.

8—93; 252—8.9, 52, 89, 316, 352

UNITED STATES PATENT OFFICE
CERTIFICATE OF CORRECTION

Patent No. 3,598,865  Dated  August 10, 1971

Inventor(s) Baak W. Lew

It is certified that error appears in the above-identified patent and that said Letters Patent are hereby corrected as shown below:

Column 6, line 33, "mol" should read -- ml --.

Signed and sealed this 12th day of September 1972.

(SEAL)
Attest:

EDWARD M. FLETCHER, JR.  ROBERT GOTTSCHALK
Attesting Officer  Commissioner of Patents